US011079069B2

(12) United States Patent
Werlen et al.

(10) Patent No.: US 11,079,069 B2
(45) Date of Patent: Aug. 3, 2021

(54) HYDROGEN REFUELING SYSTEM

(71) Applicant: L'Air Liquide, Societe Anonyme pour l'Etude et l'Exploitation des Procedes Georges Claude, Paris (FR)

(72) Inventors: Etienne Werlen, Tokyo (JP); Thierry Ott, Paris (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 16/466,878

(22) PCT Filed: Dec. 6, 2016

(86) PCT No.: PCT/JP2016/005073
§ 371 (c)(1),
(2) Date: Jun. 5, 2019

(87) PCT Pub. No.: WO2018/104982
PCT Pub. Date: Jun. 14, 2018

(65) Prior Publication Data
US 2020/0063917 A1    Feb. 27, 2020

(51) Int. Cl.
*F17C 7/00*    (2006.01)
(52) U.S. Cl.
CPC ........ *F17C 7/00* (2013.01); *F17C 2205/0323* (2013.01); *F17C 2221/012* (2013.01);
(Continued)
(58) Field of Classification Search
CPC ................ F17C 7/00; F17C 2205/0323; F17C 2221/012; F17C 2223/035;
(Continued)

(56) References Cited

U.S. PATENT DOCUMENTS 10,317,011 B2 *    6/2019    Okuno ...................... F17C 5/06

FOREIGN PATENT DOCUMENTS

| EP | 2 728 243 | 5/2014 |
| WO | WO 2014/094070 | 6/2014 |
| WO | WO 2016/067780 | 5/2016 |

OTHER PUBLICATIONS

International Search Report and Written Report for PCT/JP2016/005073, dated Sep. 8, 2017.

* cited by examiner

*Primary Examiner* — Jason K Niesz
(74) *Attorney, Agent, or Firm* — Christopher J. Cronin

(57) ABSTRACT

The present invention is to provide a hydrogen refueling system capable to cool down the $H_2$ pre-cooling heat exchanger fast enough when a FCV enters the HRS, so that there is no or very minimal waiting time for the customer before starting refueling. A hydrogen refueling system includes a chiller including a cooling unit that cools a circulating refrigerant by a cooling medium, a dispenser that supplies $H_2$ to a vehicle, including a heat exchanger that cools $H_2$ with the circulating refrigerant provided from the chiller, a circulation line that circulates the circulating refrigerant between the cooling unit and the heat exchanger, a chiller compressor that is provided in the chiller; a cold generation valve that is provided close to an inlet of the heat exchanger in the circulation line.

12 Claims, 3 Drawing Sheets

(52) U.S. Cl.
CPC ............... *F17C 2223/035* (2013.01); *F17C 2227/0157* (2013.01); *F17C 2227/0355* (2013.01); *F17C 2250/032* (2013.01); *F17C 2250/0631* (2013.01); *F17C 2250/0678* (2013.01); *F17C 2265/065* (2013.01); *F17C 2270/0139* (2013.01)

(58) Field of Classification Search
CPC ...... F17C 2227/0157; F17C 2227/0355; F17C 2250/032; F17C 2250/0631; F17C 2250/0678; F17C 2265/065; F17C 2270/0139; F17C 2223/036; F17C 2227/0341; F17C 2227/036
See application file for complete search history.

HYDROGEN REFUELING SYSTEM

CROSS-REFERENCE TO RELATED APPLICATIONS

This application is a § 371 of International PCT Application PCT/JP2016/005073, filed Dec. 6, 2016.

BACKGROUND ART

Field of the Invention

The present invention relates to a hydrogen refueling system, for example a hydrogen refueling station (HRS).

Description of the Related Art

According to current standards of refueling protocols, to achieve fast refueling of Fuel Cell Vehicles (FCV) tanks with 70 MPa nominal hydrogen refueling pressure, the hydrogen needs to be pre-cooled below −33° C., at dispenser outlet, in order to avoid overheating in FCV tank by adiabatic compression.

Today, this is done by having one heat exchanger, typically compact diffusion bonded heat exchanger, installed in the dispenser 520, and fed with a heat carrying fluid, typically brine (see FIG. 3, prior art). The heat carrying fluid is circulated between the traditional chiller 510 using refrigerant and the dispenser 520 by means of a pump.

In order to keep the HRS ready-to-fill coming vehicles, the heat exchanger is kept permanently at around −40° C. Due to frigorific losses on the system (heat carrying fluid loop, heat exchanger, chiller 510), the consumption of electricity is high, especially during summer. Considering that the FCV load of one HRS is typically very irregular, this is highly inefficient during periods of time when no FCV is coming. However, it is not possible to stop the chiller and let the system come back to ambient temperature, because cooling time of the complete system cannot be accepted as waiting time for a customer coming.

SUMMARY OF THE INVENTION

Previously, nominal $H_2$ refueling pressure in FCV was limited to 35 MPa. In this situation, there is little overheating of FCV tank caused by adiabatic compression at the time of refueling, and $H_2$ pre-cooling is not necessary. In order to increase FCV autonomy, nominal $H_2$ refueling pressure has been increased to 70 MPa. In the new situation, and to achieve fast FCV refueling according to current standards of refueling protocols, $H_2$ pre-cooling is needed upstream FCV tank because otherwise, the overheating of FCV tank would exceed the capability of the composite materials currently used to make FCV tanks (such as polyethylene). In pre-cooling, for the lowest dispenser fuel delivery temperature category (corresponding to fastest refueling), it is needed to cool $H_2$ so that the temperature at the outlet of the dispenser is between −33° C. and −40° C.

The target of 70 MPa FCV refueling is to reach nominal $H_2$ density in FCV tank corresponding to 70 MPa at 15° C. (i.e. 40.2 g/l), within about 3 minutes for 5 kg $H_2$ fueling quantity. Without pre-cooling, the nominal filling of FCV tank could not be achieved fast enough.

In the prior art system of FIG. 3, because all the elements within the dotted line must be at a low temperature, the time needed to cool down the system upon start-up is long. Also, due to frigorific losses of the system, even though no cold is needed for $H_2$ refueling, permanent power consumption is observed during opening times of HRS. It causes high electricity costs even if during long periods of time, no FCV refueling is performed.

This is not efficient and savings could be achieved if it was possible to stop the chiller during idle time of the HRS. In the current situation, this is not possible because the time needed to cool down all the elements within the dotted line of FIG. 3 could not be accepted as waiting time for the customer. As a matter of fact, cooling down the metal mass of the $H_2$ pre-cooling heat exchanger is a necessary preliminary condition to start refueling.

Also, other prior art described WO 2016/067780 is known, but cannot solve the above problems.

Objects of the present invention are to provide a hydrogen refueling system capable to cool down the $H_2$ pre-cooling heat exchanger fast enough when a FCV enters the HRS, so that there is no or very minimal waiting time for the customer before starting refueling.

As first invention, a hydrogen refueling system including:

a chiller including a cooling unit that cools a circulating refrigerant by a cooling medium;

a dispenser that supplies $H_2$ to a vehicle, including a heat exchanger that cools $H_2$ with the circulating refrigerant provided from the chiller;

a circulation line that circulates the circulating refrigerant between the cooling unit and the heat exchanger;

a chiller compressor that is provided in the chiller, and feeds the circulating refrigerant into the cooling unit;

a cold generation valve that is provided close to an inlet of the heat exchanger in the circulation line.

In first invention, the hydrogen refueling system may be operated in such a way that during part of the idle time of the system, the heat exchanger that cools $H_2$ with the circulating refrigerant provided from the chiller heats up more than 7° C. above its nominal temperature during FCV refueling, and that it is cooled down upon arrival of a vehicle to be refilled.

In first invention, the system further may include:

a vehicle detection system that detects that a vehicle to be refueled with $H_2$ is entering a hydrogen refueling station (HRS); and a controller that controls opening of the cold generation valve on a basis of a detection result of the vehicle detection system, and on a basis of a specific control strategy and also that controls starting of the chiller compressor.

In first invention, the specific control strategy may include one or more control types, such as temperature control, pressure control, level control or predetermined fixed opening values.

In first invention, the controller may control opening of the cold generation valve in such a way that during part of the idle time of the system, the heat exchanger that cools $H_2$ with the circulating refrigerant provided from the chiller heats up more than 7° C. above its nominal temperature during FCV refueling, and that it is cooled down upon arrival of a vehicle to be refilled.

In first invention, to control opening of the cold generation valve may include opening and closing the cold generation valve.

In first invention, "the cold generation valve" may be located at the circulation line within or out of the dispenser as long as the cold generation valve is located close to the inlet of the heat exchanger.

By locating the cold generation valve close to the inlet of the heat exchanger, most of the line between the chiller and the dispenser is circulating ambient temperature pressurized refrigerant and does not need to be cooled down. When the cold generation valve opens, the circulating refrigerant is partially vaporized and cooled down by the pressure reduction through the valve. Due to the proximity, only a small part of the refrigerant frigorific power is lost between the valve and the heat exchanger inlet nozzle. Heat exchanger cooling time is therefore minimized.

In first invention, a length of a pipe of the circulation line between the cold generation valve and the heat exchanger inlet nozzle may be less than 5 m, preferably more than 0.05 m to less than 4 m, further preferably more than 0.05 m to less than 3 m. Preferably, the cold generation valve is installed as close as possible to the inlet of the heat exchanger, considering installation constraints.

In first invention, the system further may include:

a temperature measuring unit that measures the temperature of the heat exchanger;

a valve control unit that makes an adjustment of the opening ratio of the cold generation valve so that the temperature measured by the temperature measuring unit is maintained within a predetermined temperature range or close to the target temperature.

In first invention, the controller may include the valve control unit.

In first invention, the system further may include:

a temperature comparison unit that determines whether the temperature of the heat exchanger measured by the temperature measuring unit is within a predetermined temperature range or close enough to the target temperature; and an output unit that outputs a ready-to-fill signal when the temperature comparison unit determined that the measured temperature is within the predetermined temperature range or close enough to the target temperature.

In first invention, the controller further may include a refueling control unit that controls $H_2$ refueling flow to vehicles; wherein, receiving ready-to-fill signal from the output unit, is one condition used by the refueling control unit to permit $H_2$ refueling flow to vehicles.

In first invention, the system further may include a high pressure receiver (HPR) that stores some amount of the circulating refrigerant fed from the cooling unit and cooled by the cooling unit. This is for making easier the stable operation of the chiller.

The high pressure receiver (HPR) may further be designed to accumulate some circulating refrigerant in liquid phase to have the capability to provide high cooling power during a limited period of time (i.e. to provide a flow rate of circulating refrigerant through the heat exchanger higher than the flow rate of the compressor during a short period of time). The higher cooling power may be used to achieve faster cooling of the heat exchanger upon detection of FCV entering the HRS, with a given power and size of compressor.

In first invention, the system further may include a low pressure receiver (LPR) that is provided on the line of circulating refrigerant, and is fed by the circulating refrigerant returned from the heat exchanger of the dispenser to separate the circulating refrigerant into gas phase and liquid phase if the circulating refrigerant has gas phase and liquid phase.

In case that the circulating refrigerant at the outlet of the heat exchanger has gas phase and liquid phase, LPR can separate into gas phase of the circulating refrigerant and liquid phase of the circulating refrigerant. The liquid phase of refrigerant can be stored at bottom of LPR.

When the vehicle detection system detects the vehicle, the compressor is started and the circulating refrigerant in gas phase can be fed to the cooling unit after passing through the compressor.

The low pressure receiver may further be designed to accumulate part of the circulating refrigerant in gaseous phase in order to have the capability to provide higher cooling power to the heat exchanger during a limited period of time (i.e. to provide a flow rate of circulating refrigerant through the heat exchanger higher than the flow rate of the compressor during a short period of time). The higher cooling power may be used to achieve faster cooling of the heat exchanger upon detection of FCV entering the HRS with a given power and size of compressor.

In first invention, the system further may include a low pressure gas bag, instead of LPR or with LPR, that is provided on the line of circulating refrigerant, and is fed by the gas phase of circulating refrigerant returned from the heat exchanger.

According to first invention, without maintaining the heat exchanger at cold temperature during HRS idle time, cooling of the heat exchanger is started when a vehicle entering the HRS is detected. By opening the cold generation valve that is located close to the heat exchanger of the dispenser, the circulating refrigerant is cooled down by the pressure reduction in the valve and then is fed into the heat exchanger. With this method, the only piece of equipment that needs to be cooled down to reach the condition to start refueling is the heat exchanger. This can be done fast enough to have no or minimal waiting time of the customer before starting refueling. Upon starting refueling, $H_2$ is fed into the pre-cooled heat exchanger by opening $H_2$ control valve, heat exchanger cold temperature is maintained by circulation of cold refrigerant. $H_2$ cooled to a predetermined temperature can be refueled to the vehicle.

In first invention, the controller may adjust opening of the cold generation valve in order to achieve fast cooling of the heat exchanger and temperature regulation once the target temperature is reached.

In first invention, the temperature measuring unit (or probe) may measure a temperature (t1) representative of the heat exchanger metal mass average temperature.

The valve control unit can adjust of the opening ratio of the cold generation so that the temperature (t1) measured by the temperature measuring unit is maintained within a predetermined temperature range or close to the target temperature.

By adjusting the opening ratio of the cold generation valve, the heat exchanger is cooled quickly down to a predetermined target temperature and the temperature of $H_2$ during refueling can be kept within the desired temperature range after reaching the predetermined temperature range.

Depending on operating conditions, the valve control unit may use different control strategies, such as temperature control units, pressure controlling unit, level controlling units or predetermined fixed opening values.

Temperature controlling units may be for example using PID algorithm to adjust the cold generation valve opening ratio depending on measured temperature (e.g. t1).

In the first invention, the valve control unit may be used to control the temperature (t1) of the heat exchanger metal mass or to control the temperature of circulating refrigerant at outlet of the heat exchanger in the circulation line.

Pressure controlling units may be for example using PID algorithm to adjust the cold generation valve opening ratio depending on measured pressure (e.g. refrigerant pressure at cold generation valve discharge).

In the first invention, pressure controlling unit may be used to control the pressure downstream of the cold generation valve.

Level controlling units may be for example using PID algorithm to adjust the cold generation valve opening ratio depending on measured level (e.g. refrigerant level in a receiver (e.g. LPR or HPR)). In the first invention, level controlling unit may be used to control the level in the LPR and/or in the HPR.

For example, the valve control unit may use a first strategy to achieve fast cooling, upon detection of FCV entering the HRS and, after the measured temperature (t1) reaches the predetermined temperature range, may use a second strategy to maintain the heat exchanger temperature (t1) or the temperature (t2) of the circulating refrigerant at the outlet of the exchanger within a predetermined temperature range, then use a third strategy during $H_2$ refueling to FCV and finally use a fourth strategy after the end of refueling.

For example, in first invention, the valve control unit may use a fixed opening ratio upon detection of FCV entering the HRS, until the level in the HPR reaches a low value and then may use level controlling unit to maintain measured level in the HPR within a predetermined level range.

For example, in first invention, the valve control unit may close the cold generation valve after receiving the signal of end of refueling.

In first invention, the circulating refrigerant may be for example R717 (ammonia), R22, R134a, R404a, R507; preferably R404A or R507 due to their boiling pressure above atmospheric pressure at −40° C.

In first invention, temperature of the cooling medium must be lower than the boiling point of the circulating refrigerant at compressor discharge pressure. The cooling medium can be cooling water, ambient air circulation or other medium.

In first invention, the temperature measuring unit may be provided at a wall of the heat exchanger, at a channel of the circulation line within the heat exchanger or within the heat exchanger metal mass.

Alternatively, the temperature measuring unit may be provided at outlet of the heat exchanger in the refrigerant circulation line, because circulating refrigerant temperature at the outlet of the heat exchanger is representative of the average temperature of the metal mass of the heat exchanger, once it has been cooled down.

In first invention, the predetermined temperature range for the heat exchanger temperature (t1) or the temperature of circulating refrigerant at outlet of the heat exchanger may be for example −45° C. to −35° C., with a target temperature lying in between.

In first invention, the desired temperature range of $H_2$ at dispenser outlet during refueling may be for example −40° C. to −33° C.

In first invention, during $H_2$ refueling, the refueling control unit may control the opening ratio of a $H_2$ control valve on dispenser $H_2$ line that connects one high pressure $H_2$ source to the FCV tank, through the heat exchanger, the dispenser hose and the refueling nozzle. The refueling control unit may have interlocking logic and/or sequence logic with transition conditions.

In first invention, the output unit may send ready-to-fill signal to a refueling control unit. Upon receiving ready-to-fill signal from the output unit, the refueling control unit may permit opening of the $H_2$ control valve by releasing corresponding interlock and/or affecting the status of transition conditions of $H_2$ refueling sequence.

In first invention, the refueling control unit may display information about the status of heat exchanger temperature condition to start $H_2$ refueling to vehicle. When all conditions and/or interlocks prohibiting to start $H_2$ refueling to vehicle are released, the refueling control unit may send signal to display an information that $H_2$ refueling to vehicle can be started and/or to inform by audio device.

In first invention, upon refueling termination detected, the refueling control unit may send end of refueling signal to the controller or to the valve control unit.

In first invention, the controller may include a vehicle queuing calculation unit, that is using the signal(s) from vehicle detection system to calculate a signal indicating that no vehicle is waiting for refueling.

In first invention, the vehicle queuing calculation unit may further include a possibility of manual input by the operator that no vehicle is waiting for refueling.

In first invention, the vehicle queuing calculation unit may further use the end of refueling signal to calculate the signal indicating that no vehicle is waiting for refueling.

In first invention, the controller or the valve control unit may control to close the cold generation valve and stop the chiller compressor after receiving the signal of end of refueling.

In first invention, the controller or the valve control unit may further control to close the cold generation valve and stop the chiller compressor only after receiving signal from the vehicle queuing calculation unit that no vehicle is waiting for refueling.

In first invention, the low pressure receiver (LPR) may be designed to collect vaporized circulating refrigerant during the time necessary for the compressor to start.

In first invention, the high pressure receiver (HPR) may be designed as a pressure vessel, with some level indication.

In first invention, the low pressure receiver may be designed as a vessel, with some level indication.

In first invention, the low pressure receiver may include a low pressure gas bag designed to accumulate low pressure gas phase refrigerant, with some level indication.

In first invention, pressure and/or level indications of low pressure and/or high pressure receiver may be used by the cold generation valve control unit to achieve proper operation of the refrigeration cycle.

In first invention, the vehicle detection system consists for example of a camera with image treatment system, IR detector, pressure detector on the ground, magnetic loop in the ground or a combination of several detectors and/or techniques.

As second invention, a method for $H_2$ refueling to vehicles including:

detecting that a vehicle to be refueled with $H_2$ is entering a hydrogen refueling station;

opening of a cold generation valve that is provided close to an inlet of a heat exchanger in a circulation line;

starting a chiller to cool a circulating refrigerant by a cooling medium;

cooling down the heat exchanger by a cold circulating refrigerant cooled by a pressure reduction in the cold generation valve; and refueling cold $H_2$ cooled down by the heat exchanger to the vehicle while maintaining a temperature of the heat exchanger within a predetermined temperature range or close to the target temperature.

In second invention, the method further may include:

measuring a temperature (t1) of the heat exchanger;

determining whether the measured temperature (t1) within a predetermined temperature range or close enough to the target temperature;

outputting a ready-to-fill signal when determining that the measured temperature (t1) is within the predetermined temperature range or close enough to the target temperature; and releasing a corresponding interlock condition on $H_2$ control valve and/or affect the status of transition conditions of $H_2$ refueling sequence.

In second invention, the method may be operated in such a way that during part of the idle time, the heat exchanger that cools $H_2$ with the cold and/or liquid nitrogen provided from the liquid nitrogen tank heats up more than 7° C. above its nominal temperature during FCV refueling, and that it is cooled down upon arrival of a vehicle to be refilled.

In second invention, like as first invention, a length of a pipe of the circulation line between the cold generation valve and the heat exchanger inlet nozzle may be less than 5 m, preferably more than 0.05 m to less than 4 m, further preferably more than 0.05 m to less than 3 m. Preferably, the cold generation valve is installed as close as possible to the inlet of the heat exchanger, considering installation constraints.

For a further understanding of the nature and objects for the present invention, reference should be made to the detailed description, taken in conjunction with the accompanying drawing, in which like elements are given the same or analogous reference numbers and wherein:

DETAILED DESCRIPTION OF THE PREFERRED EMBODIMENTS

Several embodiments of the present invention will be explained below. The embodiments explained below are to explain one example of the present invention. The present invention is not limited to the following embodiments at all and includes various types of modifications carried out within a scope where the gist of the present invention is not changed. All of the configurations explained below are not necessarily essential configurations of the present invention.

Embodiment 1

Figure 1:
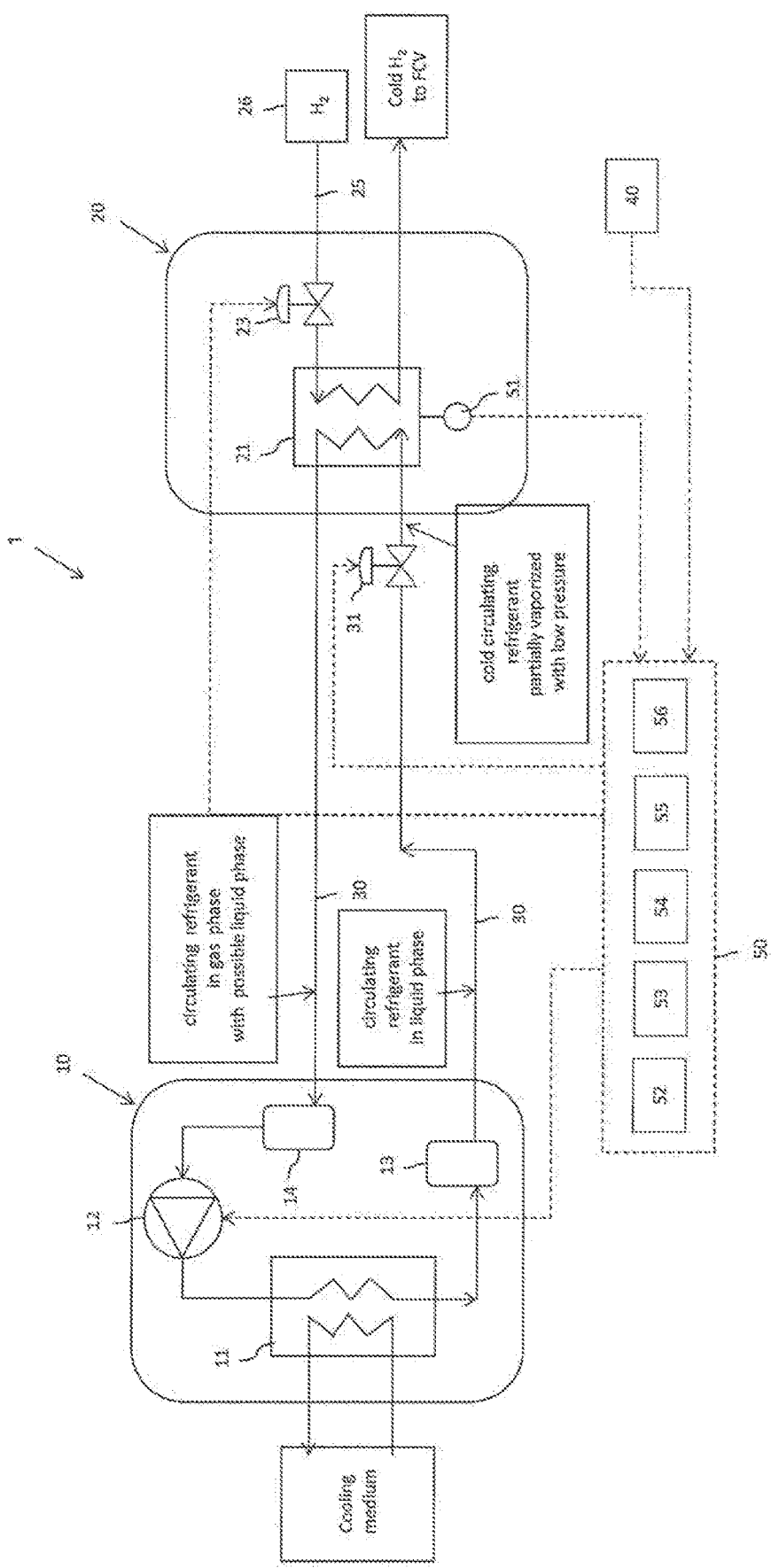
FIG. 1 illustrates an explanatory diagram showing a hydrogen refilling system according to Embodiment 1.
Figure 2:
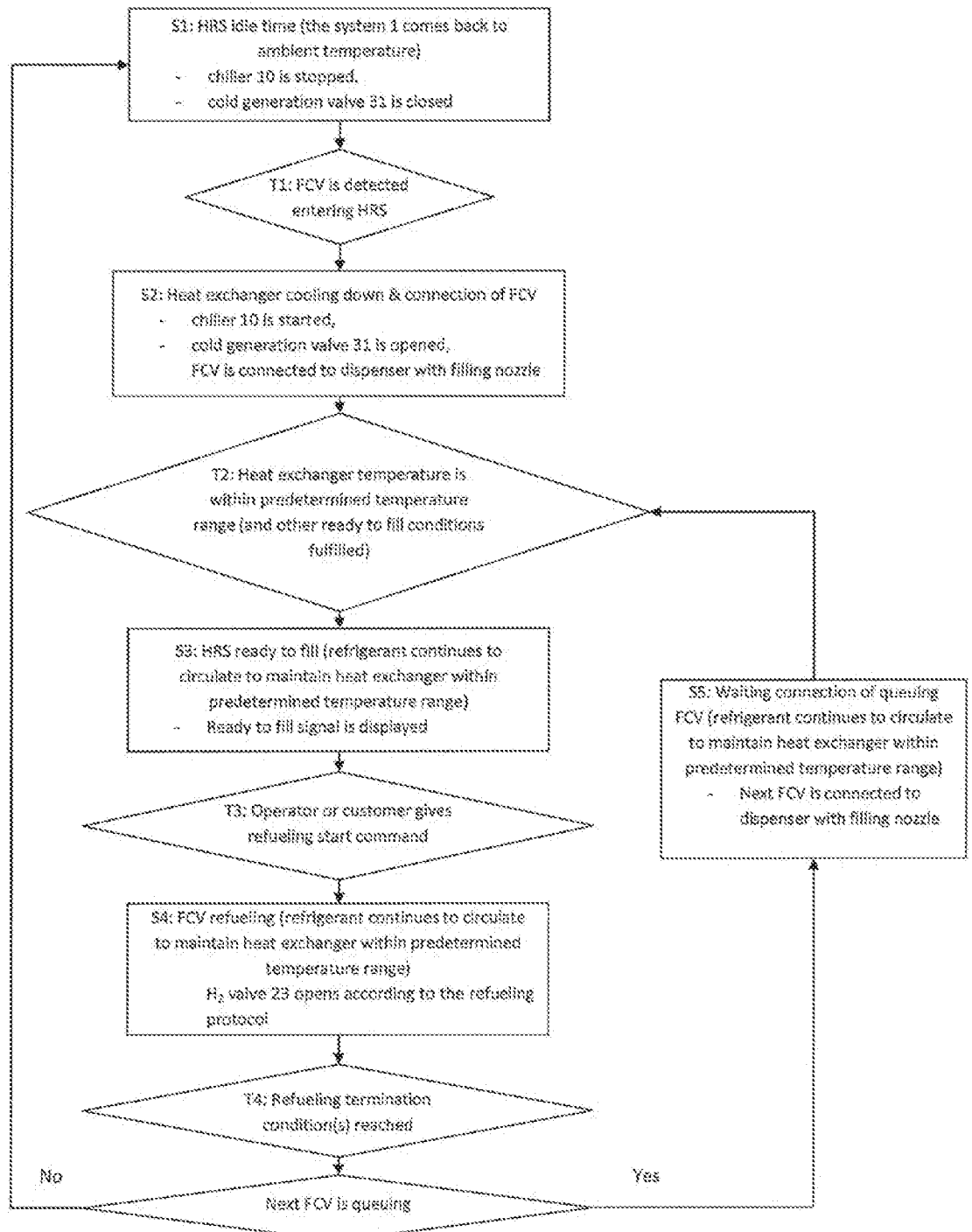
FIG. 2 illustrates an explanatory flowchart showing a hydrogen refilling system according to Embodiment 1.
Figure 3:
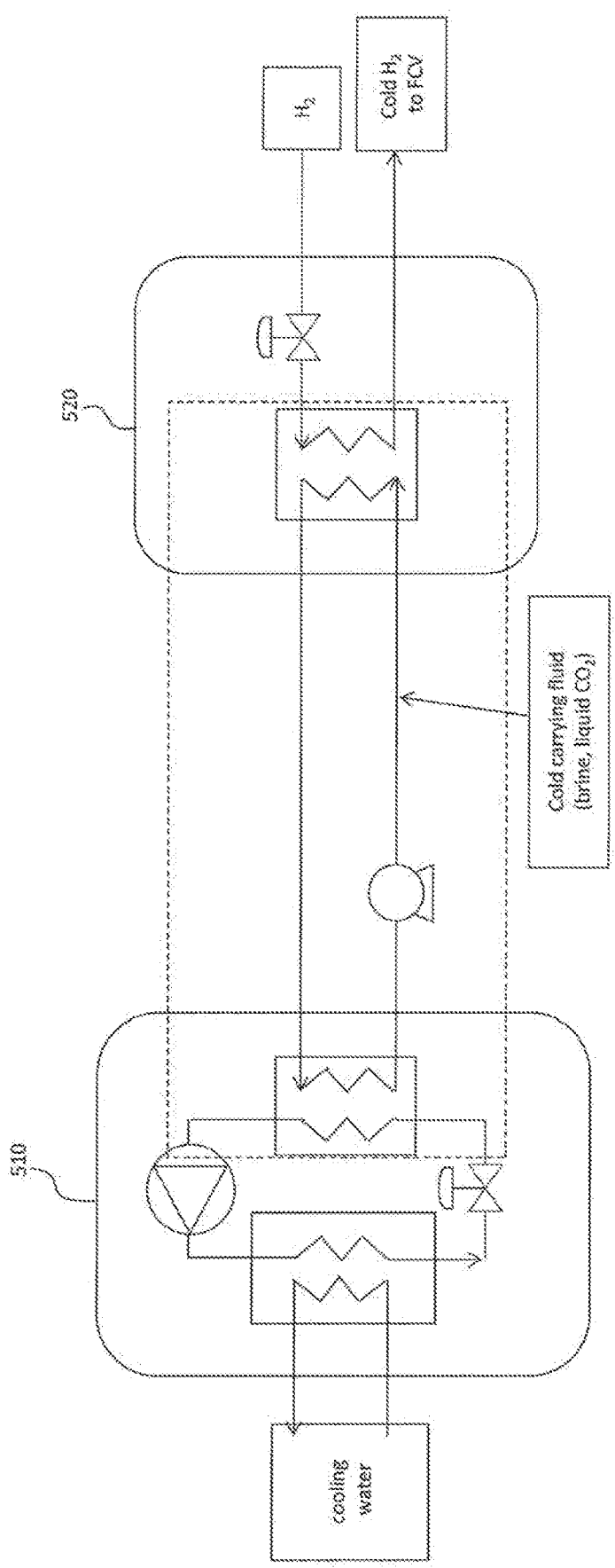
FIG. 3 illustrates an explanatory diagram showing prior art of a hydrogen refilling system.

The hydrogen refueling system 1 of the first embodiment is explained by referring FIGS. 1 and 2. The hydrogen refueling system 1 includes Chiller 10, Dispenser 20 and Circulation line 30.

First, Chiller 10 is explained below. The low pressure receiver (LPR) 14 is provided within Chiller 10. LPR 14 is fed by the circulating refrigerant returned from the heat exchanger 21 of Dispenser 20. LPR 14 can separate into gas phase and liquid phase from of the circulating refrigerant. In case that the circulating refrigerant is a fluid mixture which has gas phase and liquid phase of the circulating refrigerant, LPR 14 can separate into gas phase of the circulating refrigerant and liquid phase of the circulating refrigerant.

The liquid phase of refrigerant can be stored at bottom of LPR 14. When the vehicle detection system 40 detects the vehicle, the chiller compressor 12 is started and the circulating refrigerant in the gas phase can be fed to the cooling unit 11 after passing through the compressor 12.

LPR 14 can accumulate the circulation refrigerant in the gas phase in order to have high cooling power to be cooled $H_2$ during a limited period of time (by a short time).

LPR 14 is preferably designed to collect vaporized circulating refrigerant during the time necessary for the compressor 12 to start.

The chiller compressor 12 is provided in Chiller 10. The chiller compressor 12 can feed the circulating refrigerant in the gas phase into the cooling unit 11 from LPR 14 within a predetermined pressure range.

In this embodiment, the chiller compressor 12 is for example screw compressor type, and used to compress the circulating refrigerant up to a predetermined pressure range which is for example 1.7 to 1.9 MPa.

LPR 14 may be designed a pressure vessel, with some level indication. LPR 14 may include a low pressure gas bag designed to accumulate low pressure gas phase refrigerant.

The cooling unit 11 cools the circulating refrigerant by a cooling medium.

In this embodiment, the circulating refrigerant is R404a.

The temperature of the cooling medium is lower than the boiling point of the circulating refrigerant at compressor discharge pressure. In this embodiment, the cooling medium is cooling water.

The high pressure receiver (HPR) 13 is provided within Chiller 10. HPR 13 can store some amount of the circulating refrigerant fed from the cooling unit 11, in order to make easier the stable operation of the chiller 10. HPR 13 is designed accumulate some circulating refrigerant in liquid phase to have the capability to provide high cooling power during a limited period of time.

HPR 13 is preferably designed a pressure vessel, with some level indication.

The pressure and/or level indications of LPR 14 and/or HPR 13 may be used by the valve control unit 51 to achieve proper operation of the frigorific loop.

Next, Dispenser 20 is explained below. Dispenser 20 includes the heat exchanger 21 that cools $H_2$ with the circulating refrigerant provided from the chiller 10. Dispenser 20 includes the dispenser hose and the refueling nozzle for refueling $H_2$ to a vehicle.

In this embodiment, the temperature measuring unit 51 measures a temperature (t1) representative of the heat exchanger metal mass. The temperature measuring unit 51 may measures the temperature at a wall of the heat exchanger 21, at a channel of the circulation line 30 within the heat exchanger 21.

In other embodiment, the temperature measuring unit 51 measures the temperature of circulating refrigerant at outlet of the heat exchanger in the circulation line 30.

Next, Circulation line 30 is explained below. Circulation line 30 is a line that circulates the circulating refrigerant between the cooling unit 11 and the heat exchanger 21. Circulation line 30 is configured may be usual pipe or an insulated pipe.

The cold generation valve 31 is provided close to an inlet of the heat exchanger 21 in Circulation line 30. In this embodiment, the cold generation valve 31 is for example a throttling type valve used to reduce the pressure of circulating refrigerant. The cold generation valve 31 may be globe type valve or needle type valve.

In this embodiment, the cold generation valve 31 may be located at Circulation line 30 within or out of Dispenser 20 as long as the cold generation valve 31 is located close to the inlet of the heat exchanger 21.

In this embodiment, a length of a pipe of Circulation line 30 between the cold generation valve 31 and the heat exchanger inlet nozzle is less than 5 m.

In another embodiment, a length of a pipe of Circulation line 30 between the cold generation valve 31 and the heat exchanger inlet nozzle may be more than 0.05 m to less than 4 m, or may be more than 0.05 m to less than 3 m.

The long pipe between the cold generation valve and the heat exchanger inlet nozzle is not desirable because this line would require frigorific power for cooling down and frigorific losses would take place along the circulation line 30.

The vehicle detection system 40 detects that a vehicle to be refueled with $H_2$ is entering the HRS (Hydrogen Refueling Station). The vehicle detection system 40 is for example of a camera with image treatment system, IR detector, pressure detector on the ground, magnetic loop in the ground or a combination of several detectors and/or techniques.

Next, the controller 50 is explained below. The controller 50 may be configured by combination between hardware and software program, firmware, dedicated circuit or combination of thereof. The controller 50 includes one or more function unit (it is so called function module).

The controller 50 controls opening of the cold generation valve 31 on the basis of a detection result of the vehicle detection system 40, and on the basis of a specific control strategy and also controls starting of the chiller compressor 12. More specifically, the controller 50 includes the following functions.

The valve control unit 56 can adjust the cold generation valve 31 opening ratio so that the temperature (t1) measured by the temperature measuring unit 51 is maintained within a predetermined temperature range or close to the target temperature. By adjusting the opening ratio of the cold generation valve 31, the heat exchanger 21 is cooled quickly down to a predetermined target temperature and the temperature of $H_2$ during refueling can be kept within the desired temperature range after reaching the predetermined temperature range.

The valve control unit 56 may use a first strategy to achieve fast cooling, upon detection of FCV entering the HRS and, after the measured temperature (t1) reaches the predetermined temperature range, may use a second strategy to maintain the heat exchanger temperature (t1) within a predetermined temperature range, then use a third strategy during $H_2$ refueling to FCV and finally use a fourth strategy after the end of refueling.

In this embodiment, the valve control unit 56 is opened at a fixed opening ratio upon detection of FCV entering the HRS, until the level in the HPR reaches a low value and then uses level controlling unit to maintain measured level in the HPR within a predetermined level range.

In this embodiment, the valve control unit 56 may also be used to control the temperature of circulating refrigerant at outlet of the heat exchanger in the circulation line or the outlet line, in such a way that the refrigerant is slightly overheated and that no liquid refrigerant is exiting the heat exchanger.

In other embodiment, instead of or in addition to the above controls, the valve control unit 56 may include a pressure controlling unit, a level controlling unit or predetermined fixed opening values. The pressure controlling units may be for example using PID algorithm to adjust the cold generation valve opening ratio depending on the pressure measured by a pressure gauge that is provided at outlet of the heat exchanger in the circulation line or the outlet line. The level controlling units may be for example using PID algorithm to adjust the cold generation valve opening ratio depending on the level measured by a level gauge that is provided in the LPR.

The temperature comparison unit 52 determines whether the temperature (t1) measured by the temperature measuring unit 51 is maintained within the predetermined temperature range or close enough to the target temperature.

The output unit 53 outputs a ready-to-fill signal when the temperature comparison unit 52 determined that the measured temperature (t1) is within the predetermined temperature range or close enough to the target temperature.

In this embodiment, the predetermined temperature range for the heat exchanger temperature (t1) may be for example −45° C. to −35° C., with a target temperature lying in between.

The desired temperature range of $H_2$ at dispenser outlet during refueling may be for example −40° C. to −33° C.

The output unit 53 sends ready-to-fill signal to a refueling control unit 54. The refueling control unit 54 controls $H_2$ refueling flow to vehicles by Dispenser 20. During $H_2$ refueling, the refueling control unit 54 controls the opening ratio of a $H_2$ control valve 23 on a dispenser $H_2$ line 25 that connects one high pressure $H_2$ source 26, so as to feed $H_2$ into the heat exchanger 21 from $H_2$ source 26.

The refueling control unit 54 has interlocking logic and/or sequence logic with transition conditions. Typically, $H_2$ control valve 23 cannot be opened or is closed by the function of the interlocking logic and/or sequence logic. $H_2$ can be refueled by releasing relevant interlocks and/or affecting $H_2$ refueling sequence transition conditions.

In this embodiment, after receiving the ready-to-fill signal from the output unit 53, the refueling control unit 54 releases the corresponding interlock condition on $H_2$ control valve 23 and/or affect the status of transition conditions of $H_2$ refueling sequence. Subsequently, when all other conditions and/or interlocks prohibiting to start $H_2$ refueling to vehicle are released, and upon manual command by operator or customer, the refueling control unit starts refueling and opens the $H_2$ control valve 23.

The refueling control unit 54 displays information about the status of heat exchanger temperature condition to start $H_2$ refueling to vehicle. When all conditions and/or interlocks prohibiting to start $H_2$ refueling to vehicle are released, the refueling control unit 54 send signal to display an information that $H_2$ refueling to vehicle can be started and/or to inform by audio device.

The refueling control unit 54 sends a signal of end of refueling. The signal of end of refueling is for example a signal for indicating (informing) that filling termination conditions have been reached and that $H_2$ control valve 23 has been closed.

In this embodiment, the vehicle queuing calculation unit 55 calculates a signal indicating that no vehicle is waiting for refueling by using the detection signal(s) from the vehicle detection system 40. The vehicle queuing calculation unit 55 may include a possibility of manual input by the operator that no vehicle is waiting for refueling. The vehicle queuing calculation unit 55 may use the end of refueling signal to calculate the signal indicating that no vehicle is waiting for refueling.

In this embodiment, the valve control unit 56 controls to close the cold generation valve 31 and stop the chiller compressor 12 after receiving from refueling control unit 54 the signal of end of refueling and receiving from the vehicle queuing calculation unit 55 the signal that no vehicle is waiting for refueling, and as long as the level in HPR 13 has reached a high value.

Next flowchart of FIG. 2 is explained below.

In the HRS idle time, when level in HPR 13 has reached a high value, Chiller 10 is stopped, cold generation valve 31 is closed, the system 1 comes back to ambient temperature (step S1).

As another embodiment instead that the system 1 comes back to ambient temperature, the controller 50 may control opening of the cold generation valve 31 in such a way that during part of the idle time of the system 1, the heat exchanger 21 that cools $H_2$ with the circulating refrigerant provided from the chiller 10 heats up more than 7° C. above its nominal temperature during FCV refueling, and that it is cooled down upon arrival of a vehicle to be refilled.

The vehicle detection system 40 detects that a vehicle to be refueled with $H_2$ is entering the HRS (transition T1).

The controller 50 controls opening of the cold generation valve 31 and controls to start the chiller 10 (step S2). The chiller compressor 12 is started to be fed by the circulating refrigerant in gas phase from LPR 14 and to discharge into the cooling unit 11. The circulating refrigerant is cooled with the cooling water by the cooling unit 11. The circulating refrigerant is sent to HPR 13 and then to the cold generation valve 31 through the circulation line 30.

In this embodiment, some amount or the circulating refrigerant in liquid phase has been previously stored in HPR 13 in order to have the capability to provide high cooling power during a limited period of time.

The circulating refrigerant is cooled down by the pressure reduction in the cold generation valve 31 and then is fed into the heat exchanger 21. The temperature within the heat exchanger 21 drops down rapidly. The circulating refrigerant is sent into LPR 14 through the circulation line 30 from the heat exchanger 21.

First, the valve control unit 56 controls the cold generation valve 31 on a fixed high opening ratio upon detection of FCV entering the HRS, thus providing high cooling power. The flow of vaporized refrigerant that exceeds the capacity of the compressor 12 is stored in LPR 14. Then, when liquid level measured in HPR 13 reaches a low value, the valve control unit 56 changes strategy to control the level in HPR 13 within a predefined level range.

The temperature of heat exchanger 21 is measured by the temperature measuring unit 51. The temperature comparison unit 52 determines whether the temperature (t1) measured by the temperature measuring unit 51 is within the predetermined temperature range or close enough to the target temperature.

In the meantime, the vehicle to be refueled is positioned in front of the dispenser. Then, operator or customer connects the FCV receptacle to the dispenser using dispenser hose and nozzle.

The output unit 53 outputs a ready-to-fill signal when the temperature comparison unit 52 determined that the measured temperature (t1) is within the predetermined temperature range or close enough to the target temperature. After receiving the ready to fill signal from the output unit 53, the refueling control unit 54 releases the corresponding interlock condition on $H_2$ control valve 23 and/or affect the status of transition conditions of $H_2$ refueling sequence.

After receiving the ready-to-fill signal from the output unit 53, the valve control unit 56 changes strategy to control the temperature of circulating refrigerant at outlet of the heat exchanger in the circulation line or the outlet line, in such a way that the refrigerant is slightly overheated and that no liquid refrigerant is exiting the heat exchanger. In this mode of operation, the chiller is sized to have some excess of frigorific power, in such a way that the chiller is maintained at high frigorific power until the level of refrigerant in HPR reaches a high value.

Subsequently, when other ready-to-fill conditions are fulfilled (e.g. detection that dispenser nozzle has been connected to FCV receptacle), the system is goes to step S3 (transition T2).

HRS is in ready-to-fill status and refrigerant continues to circulate, in order to maintain the heat exchanger temperature within a predetermined temperature range or close to the target temperature (step S3). The valve control unit 56 continues to use the same strategy to maintain the heat exchanger temperature (t1) within a predetermined temperature range.

The refueling control unit 54 displays information about the status of heat exchanger temperature condition to start $H_2$ refueling to vehicle. The refueling control unit 54 send signal to display an information that $H_2$ refueling to vehicle can be started and/or to inform by audio device.

The operator or customer gives start command of $H_2$ refueling to the vehicle (transition T3).

Following filling protocol, the refueling control unit 54 controls $H_2$ control valve 23, in order to transfer hydrogen from the hydrogen high pressure source 26 to the tank of FCV; and refrigerant continues to circulate, in order to maintain the heat exchanger within a predetermined temperature range or close to the target temperature (step S4). The valve control unit 56 continues to use the same strategy to maintain the heat exchanger temperature (t1) within a predetermined temperature range.

The refueling control unit 54 sends a signal of end of refueling indicating (informing) that filling termination conditions have been reached and that $H_2$ control valve 23 has been closed (transition T4).

If the vehicle queuing calculation unit 55 sends signal that no other vehicle is waiting for refueling, the system goes to step S1, which is already described above.

If the vehicle queuing calculation unit 55 sends signal that another vehicle is waiting for refueling, the system goes to step S5, which is described below.

The next vehicle to be refueled is positioned in front of the dispenser. Then, operator or customer connects the FCV receptacle to the dispenser using dispenser hose and nozzle (step S5). The valve control unit 56 continues to use the same strategy to maintain the heat exchanger temperature (t1) within a predetermined temperature range.

Subsequently, when other ready-to-fill conditions are fulfilled (e.g. detection that dispenser nozzle has been connected to FCV receptacle), the system goes to step S3, which is already described above (transition T2).

Example 1

Currently, the weight of compact stainless steel diffusion bonded heat exchangers used in $H_2$ dispensers can be around 150 kg. Around 5000 kJ are necessary to cool down the mass of the heat exchanger from 30° C. to −40° C.

This could be achieved within 3 minutes with around 30 kW frigorific power. Such power is achievable with small size compact chillers. Shorter cooling time or reduced chiller frigorific power could be achieved by using the strategy of storing some amount of liquid refrigerant in HPR as described above.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A hydrogen refueling system comprising:
    a chiller including a cooling unit that cools a circulating refrigerant by a cooling medium;
    a dispenser that supplies $H_2$ to a vehicle, including a heat exchanger that cools $H_2$ with the circulating refrigerant provided from the chiller;
    a circulation line that circulates the circulating refrigerant between the cooling unit and the heat exchanger;
    a chiller compressor that is provided in the chiller, and feeds the circulating refrigerant into the cooling unit; and
    a cold generation valve that is provided close to an inlet of the heat exchanger in the circulation line.

2. The hydrogen refueling system of claim 1, the system further comprising:
    a vehicle detection system that detects that a vehicle to be refueled with $H_2$ is entering a hydrogen refueling station; and
    a controller that controls opening of the cold generation valve on a basis of a detection result of the vehicle detection system, and on a basis of specific control strategy and also that controls starting of the chiller compressor.

3. The hydrogen refueling system of claim 1, wherein a length of a pipe of the circulation line between the cold generation valve and the heat exchanger inlet nozzle is less than 5 m.

4. The hydrogen refueling system of claim 1, the system further comprising a high pressure receiver that stores some amount of the circulating refrigerant fed from the cooling unit and cooled by the cooling unit.

5. The hydrogen refueling system of claim 1, the system further comprising a low pressure receiver that is provided on the line of circulating refrigerant, and is fed by the circulating refrigerant returned from the heat exchanger of the dispenser to separate the circulating refrigerant into gas phase and liquid phase if the circulating refrigerant has gas phase and liquid phase.

6. The hydrogen refueling system of claim 1, the system further comprising a low pressure gas bag that is provided on the line of circulating refrigerant, and is fed by the gas phase of circulating refrigerant returned from the heat exchanger.

7. The hydrogen refueling system of claim 1, the cold generation valve is throttling type valve.

8. The hydrogen refueling system of claim 1, the system further comprising:
    a temperature measuring unit that measures the temperature of the heat exchanger; and
    a valve control unit that makes an adjustment of the opening ratio of the cold generation valve so that the temperature measured by the temperature measuring unit is maintained within a predetermined temperature range or close to the target temperature.

9. The hydrogen refueling system of claim 8, the system further comprising:
    a temperature comparison unit that determines whether the temperature of the heat exchanger measured by the temperature measuring unit is within a predetermined temperature range or close enough to the target temperature; and
    an output unit that outputs a ready-to-fill signal when the temperature comparison unit determined that the measured temperature is within the predetermined temperature range or close enough to the target temperature.

10. The hydrogen refueling system of claim 9, wherein the controller comprises a refueling control unit that controls $H_2$ refueling flow to vehicles; wherein, receiving ready-to-fill signal from the output unit, is one condition used by the refueling control unit to permit $H_2$ refueling flow to vehicles.

11. A method for $H_2$ refueling to vehicles comprising:
    detecting that a vehicle to be refueled with $H_2$ is entering a hydrogen refueling station;
    opening of a cold generation valve that is provided close to an inlet of a heat exchanger in a circulation line;
    starting a chiller to cool a circulating refrigerant by a cooling medium;
    cooling down the heat exchanger by a cold circulating refrigerant cooled by a pressure reduction in the cold generation valve; and
    refueling cold $H_2$ cooled down by the heat exchanger to the vehicle while maintaining a temperature of the heat exchanger within a predetermined temperature range or close to the target temperature.

12. The method of claim 11, further comprising:
    measuring a temperature (t1) of the heat exchanger;
    determining whether the measured temperature (t1) within a predetermined temperature range or close enough to the target temperature;

outputting a ready-to-fill signal when determining that the measured temperature (t1) is within the predetermined temperature range or close enough to the target temperature; and releasing a corresponding interlock condition on $H_2$ control valve and/or affect the status of transition conditions of $H_2$ refueling sequence.

* * * * *